US010938253B2

(12) United States Patent
Sun et al.

(10) Patent No.: US 10,938,253 B2
(45) Date of Patent: *Mar. 2, 2021

(54) WIRELESS POWER SYSTEM WITH BATTERY CHARGE INDICATORS

(71) Applicant: Apple Inc., Cupertino, CA (US)

(72) Inventors: Adrian E. Sun, Mountain View, CA (US); Gregory H. Nayman, Mountain View, CA (US); Cortland S. Tolva, Redwood City, CA (US); Joseph W. Colosimo, Sunnyvale, CA (US); Antonio R. De Lima Fernandes, Santa Clara, CA (US); Brandon R. Garbus, Santa Clara, CA (US); Alexei E. Kosut, Campbell, CA (US)

(73) Assignee: Apple Inc., Cupertino, CA (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/026,931

(22) Filed: Jul. 3, 2018

(65) Prior Publication Data
US 2019/0081499 A1 Mar. 14, 2019

Related U.S. Application Data

(60) Provisional application No. 62/556,236, filed on Sep. 8, 2017.

(51) Int. Cl.
*H02J 50/80* (2016.01)
*H02J 50/40* (2016.01)
(Continued)

(52) U.S. Cl.
CPC ............ *H02J 50/80* (2016.02); *H02J 7/0047* (2013.01); *H02J 7/025* (2013.01); *H02J 7/027* (2013.01);
(Continued)

(58) Field of Classification Search
CPC .. H02J 50/40; H02J 50/80; H02J 5/005; H02J 7/025; H02J 17/00; H04R 2420/07; H01F 38/14
See application file for complete search history.

(56) References Cited

U.S. PATENT DOCUMENTS

9,210,498 B1 * 12/2015 Shaffer .................. H04R 1/105
9,301,259 B2    3/2016 Tuli
(Continued)

*Primary Examiner* — Daniel J Cavallari
*Assistant Examiner* — David A Shiao
(74) *Attorney, Agent, or Firm* — Treyz Law Group, P.C.; G. Victor Treyz; Matthew R. Williams (57) ABSTRACT

A wireless power system includes a wireless power transmitting device such as a wireless charging mat for charging devices such as a cellular telephone and an earbuds battery case. The earbuds battery case receives earbuds and charges the earbuds from a battery. The wireless charging mat supports bidirectional in-band communications between the cellular telephone and the earbuds battery case. The earbuds battery case provides the cellular telephone with information on the battery charge level associated with the battery in the earbuds battery case and a battery charge level associated with each earbud in the earbuds battery case. The cellular telephone receives battery charge level information through the wireless charging mat and displays corresponding indicators. The earbuds battery case has a visual output device such as a light-emitting diode that is illuminated to indicate that the earbuds battery case is being charged.

21 Claims, 4 Drawing Sheets

(51) Int. Cl.
*H02J 7/02* (2016.01)
*H04R 1/10* (2006.01)
*H04M 1/04* (2006.01)
*H02J 7/00* (2006.01)
*H04M 1/02* (2006.01)
*H04B 1/3883* (2015.01)
*H04M 1/60* (2006.01)
*H04M 1/725* (2021.01)
*H02J 50/10* (2016.01)
*H04R 1/02* (2006.01)

(52) U.S. Cl.
CPC ............ *H02J 50/40* (2016.02); *H04M 1/04* (2013.01); *H04R 1/1025* (2013.01); *H02J 7/00034* (2020.01); *H02J 50/10* (2016.02); *H04B 1/3883* (2013.01); *H04M 1/0202* (2013.01); *H04M 1/6066* (2013.01); *H04M 1/7253* (2013.01); *H04M 1/72519* (2013.01); *H04R 1/028* (2013.01); *H04R 1/10* (2013.01); *H04R 1/1016* (2013.01); *H04R 2420/07* (2013.01)

(56) References Cited

U.S. PATENT DOCUMENTS

| | | | |
|---|---|---|---|
| 9,660,480 B2 | 5/2017 | Yoon et al. | |
| 2006/0135218 A1 | 6/2006 | Son et al. | |
| 2010/0201533 A1* | 8/2010 | Kirby | H02J 7/025 340/636.1 |
| 2013/0300355 A1 | 11/2013 | Jung | |
| 2014/0302782 A1* | 10/2014 | Raab | H01F 38/14 455/41.1 |
| 2015/0054458 A1* | 2/2015 | Yoon | H02J 5/005 320/108 |
| 2015/0350146 A1* | 12/2015 | Cary | H04W 4/90 709/206 |
| 2016/0050271 A1* | 2/2016 | Tohzaka | H04L 67/1095 709/248 |
| 2016/0141908 A1 | 5/2016 | Jakl et al. | |
| 2016/0342311 A1* | 11/2016 | Homick | H04W 4/80 |
| 2017/0094392 A1* | 3/2017 | Zorkendorfer | H04B 1/3888 |
| 2017/0339482 A1* | 11/2017 | Schrems | G06F 1/1626 |
| 2018/0248414 A1* | 8/2018 | Liu | H02J 7/00 |

* cited by examiner

WIRELESS POWER SYSTEM WITH BATTERY CHARGE INDICATORS

This application claims the benefit of provisional patent application No. 62/556,236, filed on Sep. 8, 2017, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has wireless power receiving circuitry that receives the wirelessly transmitted power.

In some arrangements, it can be difficult to determine whether equipment in a wireless power system is operating satisfactorily. For example, it may be difficult to determine which devices in a system are receiving power, it may be difficult to ascertain battery charge levels, and it may be difficult to determine which portable devices are associated with each other.

SUMMARY

A wireless power system includes a wireless power transmitting device such as a wireless charging mat. The wireless charging mat has coils that transit wireless power signals to one or more wireless power receiving devices. The wireless power receiving devices can include a cellular telephone and a battery case for an accessory such as an earbuds battery case.

An earbuds battery case receives earbuds and uses a wired connection to charge the earbuds from a battery within the earbuds battery case. The wireless charging mat is used in forming bidirectional in-band communications links with the cellular telephone and the earbuds battery case.

The earbuds battery case provides the cellular telephone with information on the battery charge level associated with the battery in the earbuds battery case and a battery charge level associated with each earbud in the earbuds battery case. The cellular telephone receives this charge level information wirelessly through the wireless charging mat and displays battery charge level indicators on a display in the cellular telephone.

The earbuds battery case has a visual output device such as a light-emitting diode that is illuminated to indicate that the earbuds battery case is being charged. The illumination of the light-emitting diode may be synchronized with the presentation of the battery charge level information on the display of the cellular telephone.

DETAILED DESCRIPTION

A wireless power system has a wireless power transmitting device such as a wireless charging mat. The wireless power transmitting device wirelessly transmits power to one or more wireless power receiving devices such as wristwatches, media players, cellular telephones, tablet computers, laptop computers, accessories such as audio accessories (e.g., headphones, earbuds, etc.), computer mice, trackpads, stylus devices, or other electronic equipment. In some configurations, the wireless power receiving devices include battery cases (sometimes referred to as battery packs, supplemental batteries, covers, etc.). As an example, a wireless power transmitting device may be used in wirelessly charging battery cases for earbuds.

Wireless power receiving devices use power from a wireless power transmitting device for powering circuitry in the wireless power receiving devices and for charging an internal battery. A wireless power receiving device such as a battery case for a pair of earbuds transfers battery power from the battery case to a pair of earbuds that have been received within an interior portion of the battery case using a wired connection.

The wireless power transmitting device has one or more wireless power transmitting coils arranged under a charging surface. During operation, the wireless power transmitting coils are used to transmit wireless power signals that are received by a wireless power receiving coil in the wireless power receiving device. Wireless power signals are transmitted at a wireless power transmission frequency such as a frequency of about 128 kHz, frequencies in a range between 100 kHz and 200 kHz, or other suitable frequency.

Figure 1:
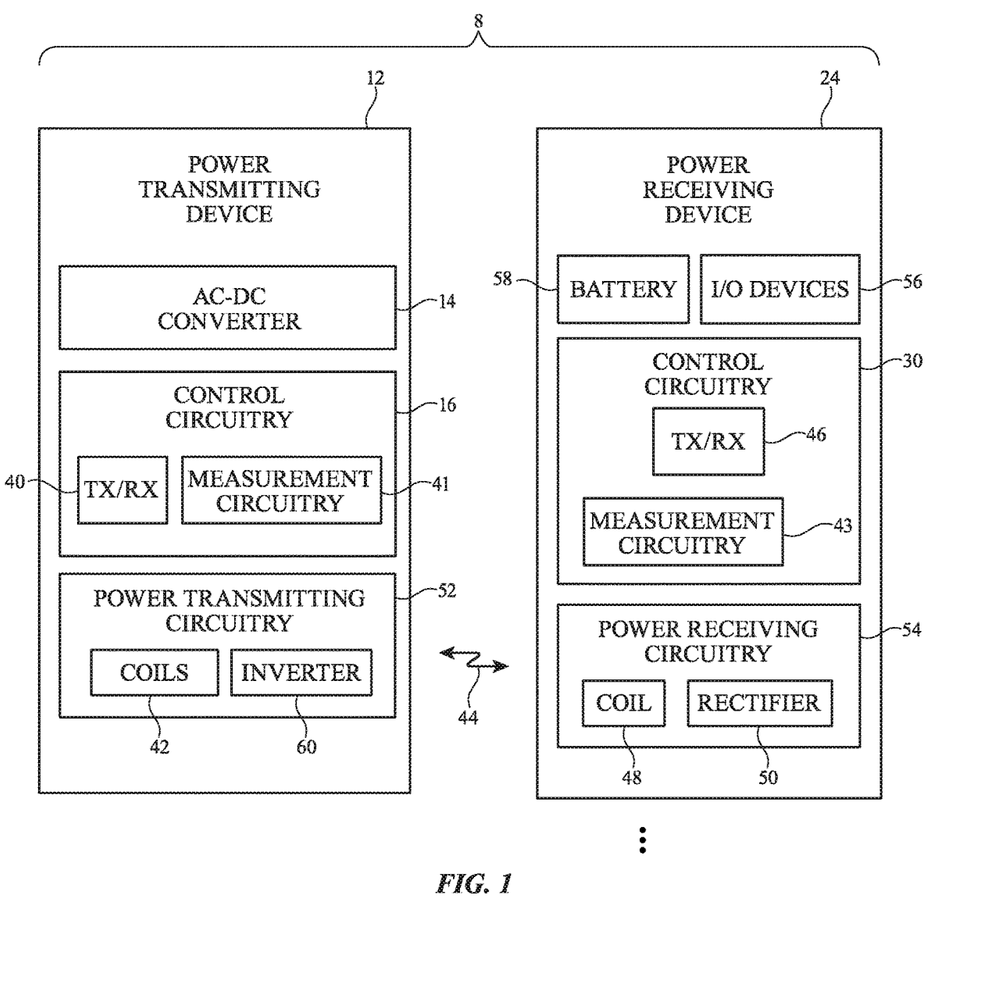
FIG. 1 is a schematic diagram of an illustrative wireless charging system that includes a wireless power transmitting device and wireless power receiving devices in accordance with an embodiment.

An illustrative wireless power system (wireless charging system) is shown in FIG. 1. As shown in FIG. 1, wireless power system 8 includes a wireless power transmitting device such as wireless power transmitting device 12 and includes wireless power receiving devices 24. Wireless power transmitting device 12 includes control circuitry 16. Each wireless power receiving device 24 includes control circuitry 30. Control circuitry in system 8 such as control circuitry 16 and control circuitry 30 is used in controlling the operation of system 8. This control circuitry includes processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in determining power transmission levels, processing sensor data, processing user input, handling communications between devices 12 and 24 (e.g., sending and receiving in-band and out-of-band data), displaying information on device 12 and/or device(s) 24, selecting wireless power transmitting coils, and otherwise controlling the operation of system 8. If desired, control circuitry in system 8 may be used to authorize components to use power and ensure that components do not exceed maximum allowable power consumption levels.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU), digital signal processing circuits, baseband processors, power management units with processing circuitry, microcontrollers, and other processing circuitry.

Power transmitting device 12 may be a stand-alone power adapter (e.g., a wireless charging mat that includes power adapter circuitry), may be a wireless charging mat that receives power from a power adapter or other equipment using a cable, may be a portable device, may be equipment that has been incorporated into furniture, a vehicle, or other system, or may be other wireless power transfer equipment. Illustrative configurations in which wireless power transmitting device 12 is a wireless charging mat are sometimes described herein as an example.

Each power receiving device 24 may be a portable electronic device such as a wristwatch, a cellular telephone, a laptop computer, a tablet computer, an earbuds battery case or other accessory battery case, audio equipment such as earbuds or headphones (e.g., earbuds that wirelessly communicate with a cellular telephone, tablet computer, or other electronic device using a wireless connection such as a Bluetooth® link), other accessories, or other electronic equipment. Power transmitting device 12 may receive power from a wall outlet (e.g., alternating current), may have a battery for supplying power, and/or may have another source of power.

Power transmitting device 12 of FIG. 1 has an AC-DC power converter such as power converter 14 for converting AC power from a wall outlet or other power source into DC power. DC power is used to power control circuitry 16. During operation, a controller in control circuitry 16 uses power transmitting circuitry 52 to transmit wireless power to power receiving circuitry 54 of each device 24. Power transmitting circuitry 52 has switching circuitry (e.g., inverter circuitry 60 formed from transistors) that is turned on and off at an alternating-current wireless power transmission frequency based on control signals provided by control circuitry 16. This creates AC current signals through one or more coils 42. Coils 42 may be arranged in a planar coil array (e.g., in configurations in which device 12 is a wireless charging mat). Coils 42 can overlap with adjacent coils 42.

As AC currents pass through one or more coils 42, alternating-current electromagnetic fields (signals 44) are produced that are received by one or more corresponding coils such as coil 48 in each power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering a battery such as battery 58 and can be used in powering other components in each device 24. For example, device 24 may include input-output devices 56 such as a display (e.g., a touch screen display) or other visual output device (e.g., a light-emitting diode or other visual indicator device), a touch sensor (separate from the display or part of a display), communications circuits, audio components, sensors, and other components and these components may be powered by the DC voltages produced by rectifier 50 (and/or DC voltages produced by battery 58).

Device 12 and/or device(s) 24 may communicate wirelessly using in-band or out-of-band communications. Device 12 may, for example, have wireless transceiver circuitry 40 (e.g., wireless local area network circuits, Bluetooth® circuits, cellular telephone transceiver circuitry, etc.) that wirelessly transmits out-of-band signals to device 24 using an antenna. Wireless transceiver circuitry 40 may be used to wirelessly receive out-of-band signals from device 24 using the antenna. Each device 24 may have transmitter circuitry in wireless transceiver circuitry 46 that transmits out-of-band signals to device 12. Receiver circuitry in wireless transceiver 46 may use an antenna to receive out-of-band signals from device 12.

Wireless transceiver circuitry 40 uses one or more coils 42 to transmit in-band signals to wireless transceiver circuitry 46 that are received by wireless transceiver circuitry 46 using coil 48. Any suitable modulation scheme may be used to support in-band communications between device 12 and device 24. In some configurations, frequency-shift keying (FSK) is used to convey in-band data from device 12 to device 24 and amplitude-shift keying (ASK) is used to convey in-band data from device 24 to device 12. Power is conveyed wirelessly from device 12 to device 24 during these FSK and ASK transmissions.

During wireless power transmission operations, circuitry 52 supplies AC drive signals to one or more coils 42 at a given power transmission frequency. The power transmission frequency may be, for example, a predetermined frequency of about 128 kHz, at least 80 kHz, at least 100 kHz, less than 500 kHz, less than 300 kHz, less than 200 kHz, 100-200 kHz, 50-200 kHz, 100-200 kHz, or other suitable wireless power frequency. In some configurations, device 12 varies the power transmission frequency during operation.

In configurations that support FSK in-band communications, wireless transceiver circuitry 40 uses FSK modulation to modulate the power transmission frequency of the driving AC signals that device 12 is using to transmit wireless power and thereby modulates the frequency of signals 44. In each device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In configurations that support ASK in-band communications wireless transceiver circuitry 46 transmits in-band data to device 12 by using a switch (e.g., one or more transistors in transceiver 46 that are connected to coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. Control circuitry 30 has measurement circuitry 43. Measurement circuitry 41 and 43 may be used in making inductance measurements (e.g., measurements of the inductances of coils 42 and 48), input and output voltage measurements (e.g., a rectifier output voltage, and inverter input voltage, etc.), current measurements, capacitance measurements, frequency measurements (e.g., measurements of the frequency of wireless power signals), and/or other measurements on the circuitry of system 8.

Figure 2:
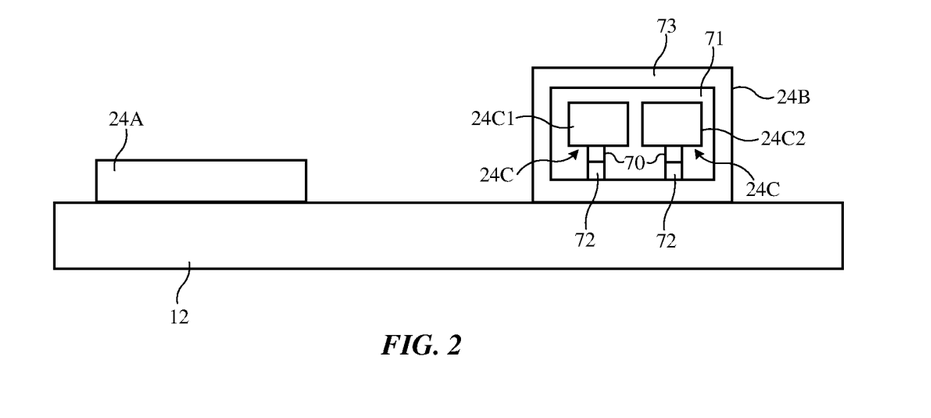
FIG. 2 is a side view of an illustrative wireless charging mat and devices on the mat that are receiving wireless power in accordance with an embodiment.

FIG. 2 is a diagram of system 8 in an illustrative configuration in which wireless power transmitting device 12 is a wireless charging mat, a first wireless power receiving device that receives power from wireless charging mat 12 is a cellular telephone or other portable device with a display (see, e.g., cellular telephone 24A, which may have a touchscreen) and a second wireless power receiving device that receives power from wireless charging mat 12 is an earbuds case with a battery (see, e.g., earbuds battery case 24B, which may not have a touchscreen). The third device in the illustrative configuration of FIG. 2 is a pair of earbuds 24C (e.g., earbuds 24C that receive audio wirelessly from cellular telephone 24A). Earbuds 24C are received within interior region 71 of earbuds battery case housing 73 (e.g., a housing formed from plastic, metal, fabric, leather, and/or other materials. Earbuds 24C include left earbud 24C1, which is configured to be received within the left ear of a user, and right earbud 24C2, which is configured to be received within the right ear of a user. Earbuds 24C contain batteries (battery 58 of FIG. 1) and may receive battery power from the batteries in earbud case 24B via wired connections. For example, each earbud has a connector 70 that mates with a corresponding connector 72 in earbuds case 24B so that earbuds case 24B may transfer power from a battery in earbuds case 24B to earbuds 24C and so that earbuds 24C can communicate over the wired connection (e.g., the contact connections formed from contacts in connectors 70 and 72) with control circuitry in case 24B. If desired, earbuds 24C may each include power receiving circuitry 54 for wirelessly receiving power directly from a wireless power transmitting device such as wireless charging mat 12. Wireless power transfer operations (inductive charging) and wireless data communications in system 8 between devices 24 and/or device 12 are contactless (e.g., not wired).

Figure 3:
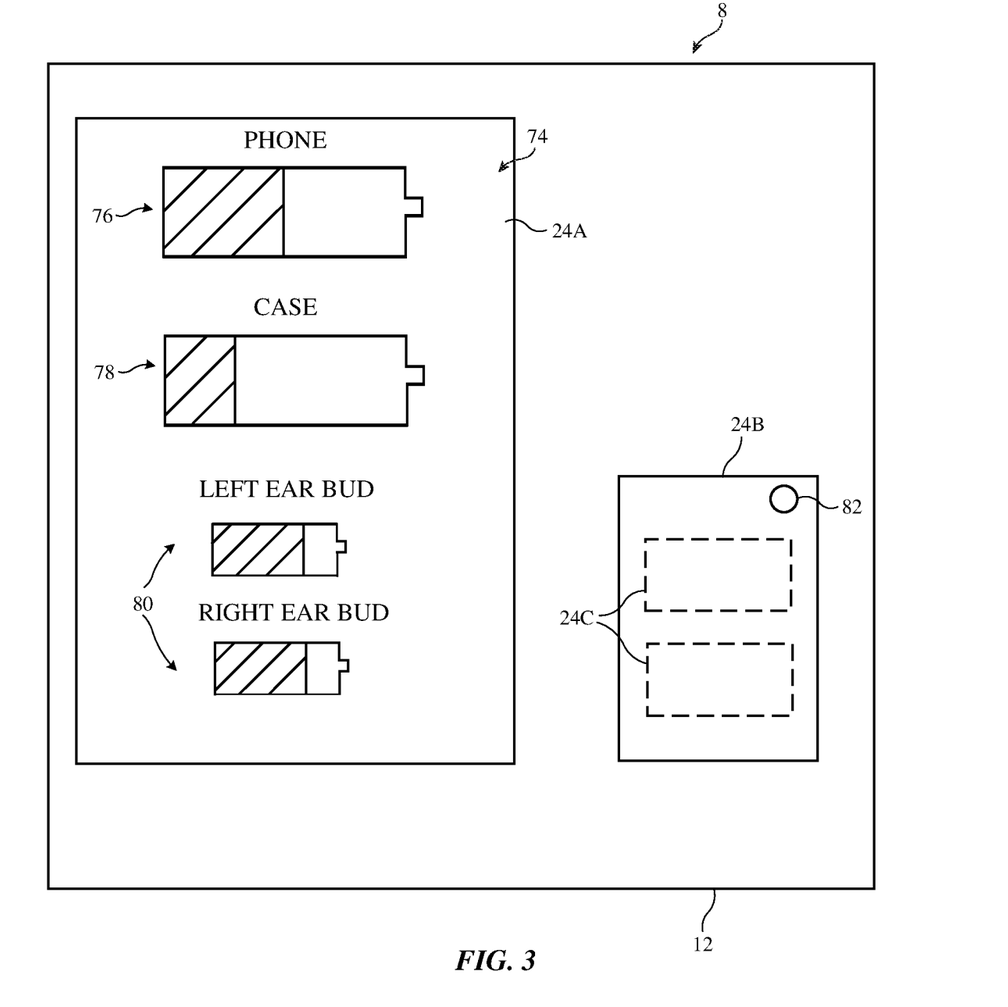
FIG. 3 is a top view of an illustrative wireless charging mat on which an accessory such as a pair of earbuds and an associated earbud battery case have been placed and on which a device such as a cellular telephone has been placed in accordance with an embodiment.

FIG. 3 shows how cellular telephone 24A has a display such as display 74. During operation, cellular telephone 24A uses display 74 and/or other input-output devices to display information for a user on the battery charge level (sometimes referred to as battery charge status, battery state of charge, battery charge information, etc.) for some or all of the devices on mat 12. As shown in FIG. 3, for example, the control circuitry of cellular telephone 24A uses display 74 to display cellular telephone battery charge level information 76 (e.g., a battery charge level indicator) indicative of the state of charge of the battery in cellular telephone 24A, uses display 74 to display earbuds case battery charge level information 78, and/or uses display 74 to display earbuds battery charge level information 80 (e.g., separate charge level information for left earbud 24C1 and right earbud 24C2). This information is conveyed to cellular telephone 24A wirelessly in system 8.

With one illustrative configuration, battery charge information from case 24B and earbuds 24C can be conveyed wirelessly to cellular telephone 24A via mat 12 (e.g., using in-band communications). Information associated with battery charging can also be conveyed wirelessly from cellular telephone 24A to case 24B and earbuds 24C via mat 12 (e.g., using in-band communications). Case 24B, which may contain earbuds 24C, has input-output devices such as light-emitting diode 82 (or other visual output device such as a display, a tone generator, a speaker, and/or other input-output component). Case 24B uses light-emitting diode 82 to produce visual output (e.g., steady and/or flashing light, etc.) in response to changes in battery charging status or other criteria. For example, case 24B may illuminate light-emitting diode 82 when case 24B is receiving wireless power from mat 12 and is charging its internal battery.

Figure 4:
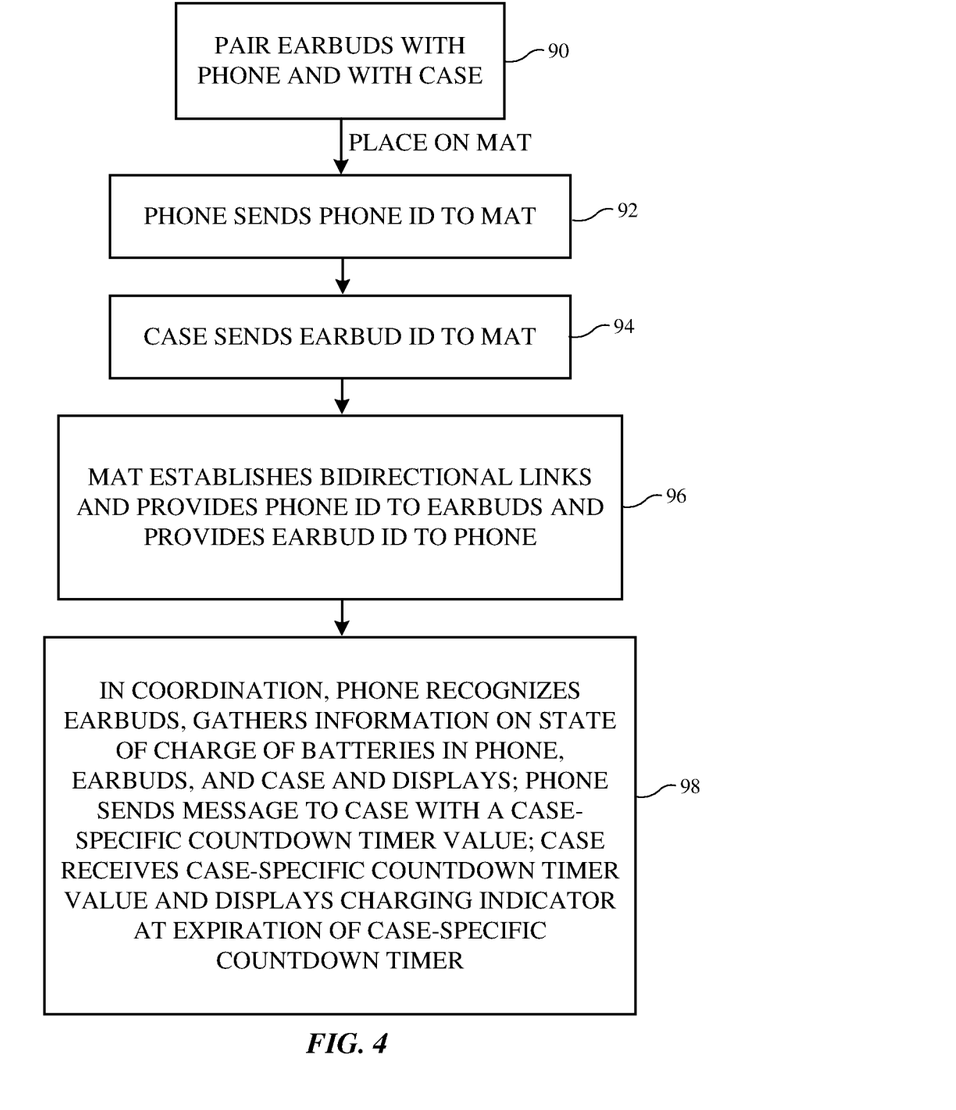
FIG. 4 is a flow chart of illustrative operations involved in operating a wireless power system in accordance with an embodiment.

Illustrative operations associated with operating system 8 are shown in the flow chart of FIG. 4. During the operations of block 90, a user performs a pairing process to pair cellular telephone and earbuds 24C (e.g., by opening case 24B in the vicinity of cellular telephone 24A and clicking on an on-screen option that is presented on cellular telephone 24A to form a connection between earbuds 24C and cellular telephone 24A). Earbuds 24C, case 24B, and/or cellular telephone 24A may, if desired, communicate wirelessly to support pairing operations (e.g., to exchange and compare device identifiers, etc.). In an illustrative configuration, earbuds 24C are coupled to case 24B using a wired connection (see, e.g., connectors 70 and 72 of FIG. 2) and this wired connection is used by case 24B to obtain the identifier associated with each earbud 24C. During the pairing operations of block 90, wireless earbuds 24C are paired with (associated with) cellular telephone 24A and are paired with case 24B. Case 24B may retain information on the identity of paired earbuds in case 24B and information on the identifier of the most recent earbuds received within case 24B. This allows case 24B to compare the identifier for earbuds that are currently enclosed in case 24 to a previously paired earbud identifier.

Earbuds case 24B may take action based on compared identifiers. For example, in response to determining that case 24B contains earbuds 24C that do not match a previously paired set of earbuds, case 24B may flash light-emitting diode 82 to warn the user that the user may have inadvertently put earbuds that belong to someone else into case 24B. Because case 24B gathers earbud identifiers that identify the earbuds 24C in case 24B, case 24B is sometimes said to inherit the identify of earbuds 24C.

Following pairing operations, a user may place cellular telephone 24A and earbuds case 24B (and any earbuds 24C in case 24B) on mat 12 for wireless charging. During the operations of block 92 and block 94, cellular telephone 24A may send an identifier (e.g., a cellular telephone identifier) to mat 12 and case 24B may obtain an identifier (e.g., an earbuds identifier) that is associated with the earbuds 24C in case 24B and send that earbuds identifier to mat 12. Wireless charging mat 12 supplies wireless power to the devices on mat 12 when obtaining the identifiers (e.g., to ensure that the devices are provided with adequate power to operate their communications circuitry and to allow in-band communications to be used to transmit the identifier information).

In an illustrative configuration, mat 12 initially senses that a reeving device is present (e.g., using a foreign object detection process that senses foreign objects based on measured coil inductances and/or other information gathered with measurement circuitry 41). This initial sensing reveals whether a given receiving device is a small low-power device such as an earbuds case or watch or is a high-power device such as a cellular telephone. Mat 12 can then provide initial wireless power based on the anticipated power rating of the receiving device. Once the receiving device identifier has been received by mat 12, mat 12 can adjust the amount of wireless power that is transmitted to a level that is appropriate for the type of receiving device that is present. The receiving device can thereafter supply real time power level adjustment requests to mat 12 (e.g., via in-band communications) that serve to direct mat 12 to increase or decrease transmitted power levels accordingly.

After the identifier information of blocks 92 and 94 has been received by mat 12, mat 12 may, during the operations of block 96, establish bidirectional communications between mat 12 and cellular telephone 24A and between mat 12 and case 24B. The bidirectional communications links that are established in this way allow cellular telephone 24A and case 24B to communicate wirelessly (e.g., using in-band communications). Mat 12 serves as an intermediary and relays messages between cellular telephone 24A and case 24B. Case 24B can communicate with earbuds 24C in case 24B using a wired connection (see, e.g., the connection formed by connectors 70 and 72 in FIG. 2). Using the bidirectional in-band link formed through mat 12, battery charge level information and other information can be exchanged during operation of system 8.

The amount of wireless power that is being delivered to case 24B can be reduced when it is desired to operate case 24B in a battery maintenance mode in which the charge state of case 24B is being maintained at a fully charged level or other desired level and in which the circuitry of case 24B is powered and able to handle wireless communications. This allows earbuds 24C to wirelessly transmit battery status information to cellular telephone 24A via mat 12. Firmware updates may also be supported (e.g., cellular telephone 24A may receive firmware updates wirelessly that are transmitted to case 24B via mat 12 so that case 24B may provide these firmware updates to earbuds 24C). When earbuds 24C are in a wirelessly powered case, wireless communications circuitry in earbuds 24C (e.g., Bluetooth® circuitry) may be maintained in an active state to support cellular telephone pairing operations. In scenarios in which earbuds 24C are in a case that is not being wirelessly powered, the earbuds may be placed in a quiescent state (e.g., a low-power sleep state) to conserve battery life. In scenarios in which case 24B on mat 12 is empty, wireless power transfer to case 24B can be periodically halted to conserve power and periodically reestablished to ensure that the battery in case 24B remains fully charged.

During the operations of block 98, system 8 may be used in displaying battery information for a user. For example, cellular telephone 24A may display battery charge level information (sometimes referred to as state of charge information) using charge level icons 76, 78, and 80 of FIG. 3 and battery case 24B may illuminate light-emitting diode 82 to indicate to the user that mat 12 is currently charging case 24B. The state of charge of the battery in each earbud 24C may be conveyed to case 24B over a wired connection (e.g., connectors 70 and 72 of FIG. 2). The state of charge of case 24B and the state of charge of earbuds 24C in case 24B may be provided to cellular telephone 24A from case 24B using in-band communications (e.g., the bidirectional communications link between case 24B and cellular telephone 24A that was established during the operations of block 96). Control circuitry 16 in cellular telephone 24A gathers information on the state of charge of its battery internally.

The display of battery charging information on display 74 of cellular telephone 24A and the illumination of light-emitting diode 82 may be coordinated, so that the battery charging information appears on display 74 in synchronization with the illumination of diode 82 (e.g., the visual output associated with these two items may commence at an identical time or nearly identical time such as times that are within 200 ms of each other, within 100 ms of each other, etc.). To ensure that light-emitting diode 82 is illuminated at the same time that display 74 first presents information 76, 78, and 80 to the user, cellular telephone 24A may, during the operations of block 98, transmit a case-specific countdown timer value to case 24B. The countdown timer value is specific to case 24 B (to accommodate multiple cases on mat 12) and informs that case 24B of the amount of time that will elapse before display 74 is used in displaying information 76, 78, and 80. Case 24B receives the countdown timer value and starts a corresponding countdown timer. When the countdown timer expires (e.g., at the same moment that display 74 is first being used to display information 76, 78, and 80 such as shortly after cellular telephone 24A is placed on mat 12), case 24B illuminates light-emitting diode 82 or other visual status indicator in case 24B.

The behavior of system 8 in displaying battery charge information for a user may vary depending on whether a user's earbuds 24C or the earbuds of another person are present in case 24B, whether case 24B belongs to the user or to another person, whether case 24B is empty, and other factors.

For example, consider a first scenario, in which a user's cellular telephone 24A is placed on mat 12 and the case 24B of another person that contains the earbuds 24C of that other person are placed on mat 12. In this scenario, neither the case nor the earbuds on the mat are owned by the user and are therefore not paired with the cellular telephone 24A of the user. As a result, cellular telephone 24A will only display battery status information 76. In some configurations, light-emitting diode 82 may be illuminated while case 24B is wirelessly charged, but the illumination of light-emitting diode 82 will not be coordinated with the display of information 76 on display 74 using a countdown timer value, because cellular telephone 24A does not recognize the case and does not recognize the earbuds. The same result would be obtained if the earbuds of the other person were to be placed in the case 24B of the user (because case 24B inherits the identity of the earbuds 24C received within case 24B).

In a second scenario, a user places the user's earbuds 24C in a borrowed case 24B belonging to another person and places case 24B and the user's cellular telephone 24A on mat 12. The earbuds 24C were previously paired with the user's cellular telephone. In this scenario, the borrowed case 24B inherits the identifier of the earbuds 24C that are contained within the borrowed case. Cellular telephone 24A was previously paired with earbuds 24C and therefore displays information 76, 78, and 80 on display 74. In anticipation of displaying this information on display 74, cellular telephone 24A transmits an appropriate countdown timer value to case 24B. This allows case 24B and cellular telephone 24A to simultaneously activate and thereby synchronously display information 76, 78, and 80 (on display 74) and illuminate light-emitting diode 82 (on case 24B).

In a third scenario, a users' empty case 24B is placed on mat 12 with a user's cellular telephone 24A. If the case previously contained the user's earbuds 24C, this information is retained by case 24B, so light-emitting diode 82 may be illuminated at the same time that cellular telephone 24A displays charge status information 76 and 78. Charge status information 80 is not displayed, because earbuds 24C are not present. If the case previously contained the earbuds 24C of another person (e.g., earbuds 24C are not paired with cellular telephone 24A), case battery status information 78 is omitted from display 74 and light-emitting diode 82 is not synchronized with the battery status information displayed on display 74. The same result is obtained if case 24B belongs to another person, because this aspect of the behavior of system 8 depends on the identity of the last earbuds 24C present in case 24B.

In a fourth scenario, a user's case 24B containing the user's earbuds 24C is placed on mat 12 and the user's cellular telephone 24A is placed on mat 12. As described in connection with the operations of block 98, cellular telephone 24A will transmit countdown time value to case 24B, so that information 76, 78, and 80 is displayed on display 74 simultaneously with the illumination of light-emitting diode 82 on case 24B.

The foregoing is merely illustrative and various modifications can be made to the described embodiments. The foregoing embodiments may be implemented individually or in any combination.

What is claimed is:

1. A system operable with a wireless power transmitting device, comprising:
    a first wireless power receiving device configured to receive wireless power from the wireless power transmitting device and having a first visual output device; and
    a second wireless power receiving device configured to receive wireless power from the wireless power transmitting device and having a second visual output device, wherein the second wireless power receiving device includes control circuitry configured to:
        coordinate display of first and second visual output on the first and second visual output devices respectively, wherein the first and second visual output each represent battery charging status and wherein coordinating display of the first and second output comprises transmitting a communication to the first wireless power receiving device indicating a time at which to simultaneously display the first and second visual output.

2. The system of claim 1 wherein the second wireless power receiving device includes a battery and wherein the second visual output comprises a battery charge level indicator associated with a level of battery charge on the battery of the second wireless power receiving device.

3. The system of claim 2 wherein the second visual output device comprises a display and wherein the control circuitry is configured to display the battery charge level indicator on the display.

4. The system of claim 3 wherein the first wireless power receiving device includes a battery and wherein the first visual output indicates that the battery in the first wireless power receiving device is being charged using the wireless power received by the first wireless power receiving device.

5. The system of claim 4 wherein the first visual output device comprises a light-emitting diode, wherein the first visual output is produced by illumination of the light-emitting diode, and wherein the first wireless power receiving device does not have a touchscreen.

6. The system of claim 5 wherein the control circuitry is configured to receive information on a level of battery charge on the battery in the first wireless power receiving device from the wireless power transmitting device.

7. The system of claim 6 wherein the second wireless power receiving device is configured to display, on the second visual output device, the level of battery charge on the battery of the first wireless power receiving device.

8. The system of claim 2 wherein the communication comprises a countdown timer value sent to the first wireless power receiving device through the wireless power transmitting device.

9. The system of claim 1 wherein the first wireless power receiving device is an earbuds battery case configured to receive wireless earbuds and wherein the control circuitry is configured to receive information on a level of battery charge on a battery in the wireless earbuds battery case from the wireless power transmitting device.

10. The system of claim 9 wherein the second wireless power receiving device includes a display and wherein the control circuitry is configured to use the display to display a battery charge level indicator corresponding to a level of battery charge on a battery in the wireless earbuds.

11. A wireless power receiving device operable with first and second electronic devices and operable with a wireless power transmitting device, the wireless power receiving device comprising:
    a battery;
    a display;
    wireless power receiving circuitry configured to receive wireless power from the wireless power transmitting device to charge the battery; and
    control circuitry configured to:
        receive, with the wireless power receiving circuitry, battery charge level information associated with a battery charge level in the second electronic device;
        display (i) the battery charge level information for the second electronic device on the display and (ii) battery charge level information for the battery, on the display; and
        transmit a communication comprising timing information indicating a subsequent time to begin producing a visual output to the second electronic device to cause the second electronic device to produce the visual output in synchronization with the displaying of the battery charge level information associated with the battery on the display.

12. The wireless power receiving device of claim 11 wherein the second electronic device comprises a case for carrying and charging earbuds, the case having a battery.

13. The wireless power receiving device of claim 12 wherein the first electronic device comprises wireless earbuds.

14. The wireless power receiving device of claim 13 wherein the wireless earbuds are not paired with the second electronic device.

15. The wireless power receiving device of claim 11 wherein the control circuitry is further configured to:
    receive, with the wireless power receiving circuitry, battery charge level information from the second electronic device that is associated with a battery charge level in the first electronic device;

display the battery charge level information that is associated with the battery charge level in the first electronic device on the display.

16. The wireless power receiving device of claim 11 wherein the control circuitry is configured to use the wireless power receiving circuitry to transmit the communication to the second electronic device.

17. The wireless power receiving device of claim 16 wherein the communication comprises a countdown timer value.

18. The wireless power receiving device of claim 11 wherein the second electronic device is configured to charge the first electronic device over contact connections and wherein the control circuitry is configured to:

display battery charge level information associated with a battery charge level in the first electronic device on the display.

19. (Withdrawn - Currently amended) An earbuds battery case operable with earbuds, comprising:

a housing;
a battery;
a light-emitting diode;
wireless power receiving circuitry configured to receive wireless power from a wireless power transmitting device;
a connector configured to form a wired connection with earbuds received within the housing; and
control circuitry that is configured to:
gather earbud identifiers for earbuds that form wired connections with the connector;
retain at least a given earbud identifier that is associated with a pair of the earbuds that most recently formed a wired connection with the connector; and
illuminate the light-emitting diode in synchronization with a visual output from a display of an additional wireless power receiving device in response to receiving a countdown timer value from the additional wireless power receiving device.

20. The earbuds battery case of claim 19 wherein the control circuitry is configured to:

transmit the retained earbud identifier to the wireless power transmitting device while the corresponding earbud is not connected with the connector.

21. The earbuds battery case of claim 20 wherein the control circuitry is configured to transmit the retained earbud identifier using in-band communications.

* * * * *

UNITED STATES PATENT AND TRADEMARK OFFICE
CERTIFICATE OF CORRECTION

Page 1 of 1

PATENT NO. : 10,938,253 B2
APPLICATION NO. : 16/026931
DATED : March 2, 2021
INVENTOR(S) : Sun et al.

It is certified that error appears in the above-identified patent and that said Letters Patent is hereby corrected as shown below:

In the Claims

Column 11, Line 21, "(Withdrawn - Currently amended) An earbuds battery" should read -- An earbuds battery --

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*